US011789980B2

(12) United States Patent
Jang

(10) Patent No.: US 11,789,980 B2
(45) Date of Patent: Oct. 17, 2023

(54) METHOD, SYSTEM, AND NON-TRANSITORY COMPUTER READABLE RECORD MEDIUM FOR PROVIDING MULTI PROFILE

(71) Applicant: LINE CORPORATION, Tokyo (JP)

(72) Inventor: Hyukjae Jang, Seongnam-si (KR)

(73) Assignee: LINE CORPORATION, Tokyo (JP)

(*) Notice: Subject to any disclaimer, the term of this patent is extended or adjusted under 35 U.S.C. 154(b) by 0 days.

(21) Appl. No.: 16/914,580

(22) Filed: Jun. 29, 2020

(65) Prior Publication Data

US 2020/0327153 A1    Oct. 15, 2020

Related U.S. Application Data

(63) Continuation of application No. PCT/KR2017/015659, filed on Dec. 28, 2017.

(51) Int. Cl.
*G06F 16/28* (2019.01)
*G06F 16/9535* (2019.01)
(Continued)

(52) U.S. Cl.
CPC ........ *G06F 16/285* (2019.01); *G06F 16/9535* (2019.01); *G06F 16/9536* (2019.01); *G06Q 50/01* (2013.01); *H04L 67/306* (2013.01)

(58) Field of Classification Search
CPC ............... G06F 16/285; G06F 16/9535; G06F 16/9536; G06Q 50/01; H04L 67/306
(Continued)

(56) References Cited

U.S. PATENT DOCUMENTS 8,341,101 B1* 12/2012 Treiser ................... G06Q 30/02
706/45
10,346,901 B1* 7/2019 Serbanescu ........ G06Q 30/0643
(Continued)

FOREIGN PATENT DOCUMENTS

CN    107145497 B  * 12/2020  ....... G06F 16/24578
EP    2905969 A1  *  8/2015  ............ G06T 7/408
(Continued)

OTHER PUBLICATIONS

Baatarjav EPhithakkitnukoon SDantu R; "Group recommendation system for facebook". (Year: 2008).*
(Continued)

*Primary Examiner* — Amy Ng
*Assistant Examiner* — Abdullah A Daud
(74) *Attorney, Agent, or Firm* — Sughrue Mion, PLLC

(57) ABSTRACT

Provided are a method, a system, and a non-transitory computer readable record medium for providing a multi-profile. A multi-profile providing method may include identifying a relationship between a first member in an online social networking service with each of a plurality of other members in the online social networking service; classifying the plurality of other members into a plurality of groups based on the relationship between the first member and each of the plurality of other members; setting a plurality of profiles of the first member for the plurality of groups, respectively; and in response to a request to provide profile information of the first member being received from a second member among the plurality of other members, identifying one of the plurality of groups to which the second member belongs, and providing the second member with a first profile of the first member that is set for the group to which the second member belongs, among the plurality of profiles.

14 Claims, 9 Drawing Sheets

(51) Int. Cl.
*G06F 16/9536* (2019.01)
*G06Q 50/00* (2012.01)
*H04L 67/306* (2022.01)

(58) Field of Classification Search
USPC .......................................................... 707/739
See application file for complete search history.

(56) References Cited

U.S. PATENT DOCUMENTS

| | | | |
|---|---|---|---|
| 10,635,263 B2* | 4/2020 | Hosier, Jr. | H04W 4/21 |
| 2010/0281044 A1 | 11/2010 | Gupta et al. | |
| 2013/0013682 A1* | 1/2013 | Juan | G06Q 50/01 709/204 |
| 2014/0067826 A1* | 3/2014 | Jackson | G06Q 50/01 707/748 |
| 2014/0067967 A1* | 3/2014 | Jackson | G06Q 50/01 709/206 |
| 2014/0181157 A1* | 6/2014 | Houston | G06F 16/22 707/812 |
| 2014/0317676 A1 | 10/2014 | Nair et al. | |
| 2015/0127731 A1 | 5/2015 | Hamada et al. | |
| 2015/0134687 A1* | 5/2015 | Sohn | G06Q 30/02 707/758 |
| 2015/0332087 A1* | 11/2015 | Joshi | G06F 18/00 382/203 |
| 2015/0356480 A1* | 12/2015 | Mahmud | G06Q 50/01 705/7.13 |
| 2017/0024091 A1* | 1/2017 | Hosier, Jr. | G06F 3/04883 |
| 2017/0041433 A1* | 2/2017 | Shuman | H04L 67/306 |
| 2018/0374028 A1* | 12/2018 | Johansen | G06Q 50/01 |
| 2019/0102725 A1* | 4/2019 | Xia | G06Q 10/063116 |
| 2019/0392039 A1* | 12/2019 | Clark | G06F 16/51 |

FOREIGN PATENT DOCUMENTS

| | | |
|---|---|---|
| JP | 11-3348 A | 1/1999 |
| JP | 2014-86083 A | 5/2014 |
| JP | 2015-90545 A | 5/2015 |
| JP | 5903011 B2 | 4/2016 |
| KR | 10-2004-0096331 A | 11/2004 |
| KR | 10-1045928 B1 | 7/2011 |
| KR | 10-2014-0047695 A | 4/2014 |
| KR | 10-2015-0055689 A | 5/2015 |
| KR | 10-1673726 B1 | 11/2016 |
| WO | 2015/186659 A1 | 12/2015 |

OTHER PUBLICATIONS

International Search Report for PCT/KR2017/015659 dated Sep. 27, 2018 [PCT/ISA/210].

English Translation of Notice of the Reasons for Rejection dated Jan. 25, 2022 from the Japanese Patent Office in JP Application No. 2020-536135.

Office Action dated Jul. 6, 2023 from the Korean Patent Office in Application No. 10-2020-7018251.

* cited by examiner

METHOD, SYSTEM, AND NON-TRANSITORY COMPUTER READABLE RECORD MEDIUM FOR PROVIDING MULTI PROFILE

CROSS-REFERENCE TO RELATED APPLICATION

This application is a continuation application of International Application No. PCT/KR2017/015659, filed on Dec. 28, 2017, the disclosure of which is incorporated herein by reference in its entirety.

BACKGROUND

1. Field

Example embodiments relate to a method and a system for providing a multi-profile, and more particularly, to a multi-profile providing method that may display a multi-profile and automate a profile display setting in an online social networking service, a computer apparatus for performing the multi-profile providing method, and a non-transitory computer-readable record medium for implementing the multi-profile providing method.

2. Description of Related Art

An online social networking service (SNS) refers to a service that enables users to build social networks or social relationships with other people through websites or applications installed on a computer device, and may include one-person media, one-person community, information sharing, and the like. Also, messaging services, such as a messenger, may be included in the social networking service. In the social networking service according to the related art, a user may create a profile of the user, including a representative profile photo, a background profile photo, and a status message. Here, unless the user modifies or recreates the profile, the profile is displayed as created, and shown to other users with whom the user has a personal relationship in the social networking service. A user of the social networking service according to the related art may have only two options, that is, whether to show a profile of the user or not.

Here, many users are using the social networking service not only for private purposes but also for business purposes and accordingly, a personal friend and a business friend or partner may be present simultaneously in one account. Therefore, profile information of the user may be shown to a group of unwanted people. Alternatively, although the user sets the profile to be private, setting the profile to be private may lead to invasion of privacy.

SUMMARY

Example embodiments provide a multi-profile providing method that may display a multi-profile and automate a profile display setting in a social networking service, a computer apparatus for performing the multi-profile providing method, and a non-transitory computer-readable record medium for implementing the multi-profile providing method.

According to an aspect of an example embodiment, there is provided a multi-profile providing method including: identifying a relationship between a first member in an online social networking service with each of a plurality of other members in the online social networking service; classifying the plurality of other members into a plurality of groups based on the relationship between the first member and each of the plurality of other members; setting a plurality of profiles of the first member for the plurality of groups, respectively; and in response to a request to provide profile information of the first member being received from a second member among the plurality of other members, identifying one of the plurality of groups to which the second member belongs, and providing the second member with a first profile of the first member that is set for the group to which the second member belongs, among the plurality of profiles.

The multi-profile providing method may further include: identifying a third member newly having a personal relationship with the first member in the online social networking service; identifying a fourth member having a personal relationship with the first member and the third member, among the plurality of other members; and assigning one of the plurality of groups to the third member based on a group to which the fourth member belongs, among the plurality of groups.

The fourth member may be one of a plurality of fourth members in the online social networking service. The assigning the one of the plurality of groups to the third member may include setting, as the group of the third member, a group to which a largest number of fourth members belong, among the plurality of fourth members.

The assigning the one of the plurality of groups to the third member may include: recommending the group to which the fourth member belongs, as the group of the third member; and setting the recommended group as the group of the third member in response to the recommended group being selected the first member as the group of the third member.

The classifying the plurality of other members into the plurality of groups may include setting the plurality of groups based on analysis of a personal relationship between all members of the online social networking service. All the members may include the first member and the plurality of other members.

The classifying the plurality of other members into the plurality of groups may include calculating a degree of a personal relationship between all members of the online social networking service, by analyzing the personal relationship between all the members and classifying the plurality of other members into the plurality of groups by using the calculated degree as a parameter of a distance function.

The multi-profile providing method may further include: displaying the plurality of profiles of the first member separately for the plurality of groups.

The setting the plurality of profiles for the plurality of groups may include: providing a profile list comprising the plurality of profiles of the first member; providing a group list comprising the plurality of groups; and setting profile information of a profile selected from the profile list with respect to a group selected from the group list.

The multi-profile providing method may further include: providing a profile list comprising the plurality of profiles of the first member; providing a member list comprising the plurality of other members; and setting profile information of a profile selected from the profile list with respect to a member selected from the member list.

The multi-profile providing method may further include: resetting a group of the selected member based on the profile information set for the selected member.

The multi-profile providing method may further include: analyzing messages exchanged through the online social networking service between the first member and a first group among the plurality of groups or between the first member and the second member; creating one of the plurality of profiles based on at least one of a text and an image extracted from the analyzed message; and providing the created profile to the first group or the second member.

According to an aspect of an example embodiment, there is provided a non-transitory computer-readable record medium storing instructions that, when executed by a processor, cause the processor to perform the multi-profile providing method.

According to an aspect of an example embodiment, there is provided a computer apparatus including: at least one memory configured to store computer-readable instructions; and at least one processor configured to execute the computer-readable instructions to perform: identifying a relationship between a first member in a social networking service with each of a plurality of other members in the social networking service, classifying the plurality of other members into a plurality of groups based on the relationship between the first member and each of the plurality of other members, setting a plurality of profiles of the first member for the plurality of groups, respectively, and in response to a request to provide profile information of the first member being received from a second member among the plurality of other members, identifying one of the plurality of groups to which the second member belongs, and providing the second member with a first profile of the first member that is set for the group to which the second member belongs, among the plurality of profiles.

The at least one processor may be further configured to execute the computer-readable instructions to perform: identifying a third member newly having a personal relationship with the first member in the social networking service, identifying a fourth member having a personal relationship with the first member and the third member, among the plurality of other members, and assigning one of the plurality of groups to the third member based on a group to which the fourth member belongs, among the plurality of groups.

The at least one processor may be further configured to execute the computer-readable instructions to perform setting the plurality of groups of members based on analysis of a personal relationship between all members of the social networking service, wherein all the members may include the first member and the plurality of other members.

The at least one processor may be further configured to execute the computer-readable instructions to perform calculating a degree of a personal relationship between all members of the social networking service, by analyzing the personal relationship between all the members and classifying plurality of the other members into the plurality of groups based on the calculated degree as a parameter of a distance function, wherein all the members include the first member and the plurality of other members.

The at least one processor may be further configured to execute the computer-readable instructions to perform displaying the plurality of profiles of the first member separately for the plurality of groups.

The at least one processor may be further configured to execute the computer-readable instructions to perform: providing a profile list comprising the plurality of profiles of the first member, providing a group list comprising the plurality of groups, and setting profile information of a profile selected from the profile list with respect to a group selected from the group list.

The at least one processor may be further configured to execute the computer-readable instructions to perform: analyzing messages exchanged through the social networking service between the first member and a first group among the plurality of groups or between the first member and the second member, creating one of the plurality of profiles based on at least one of a text and an image extracted from the analyzed message, and providing the created profile to the first group and the second member.

The group to which the second member belongs may be a first group, and the at least one processor may be further configured to execute the computer-readable instructions to perform: identifying a change in the relationship between the first member and the second member; assigning a second group to the second member, among the plurality of groups, based the change in the relationship between the first member and the second member; and in response to the request to provide the profile information of the first member being received from the second member, providing the second member with a second profile that is set for the second group, among the plurality of profiles.

BRIEF DESCRIPTION OF THE FIGURES

The above and/or other aspects will be more apparent by describing certain example embodiments, with reference to the accompanying drawings, in which.

DETAILED DESCRIPTION

Figure 1:
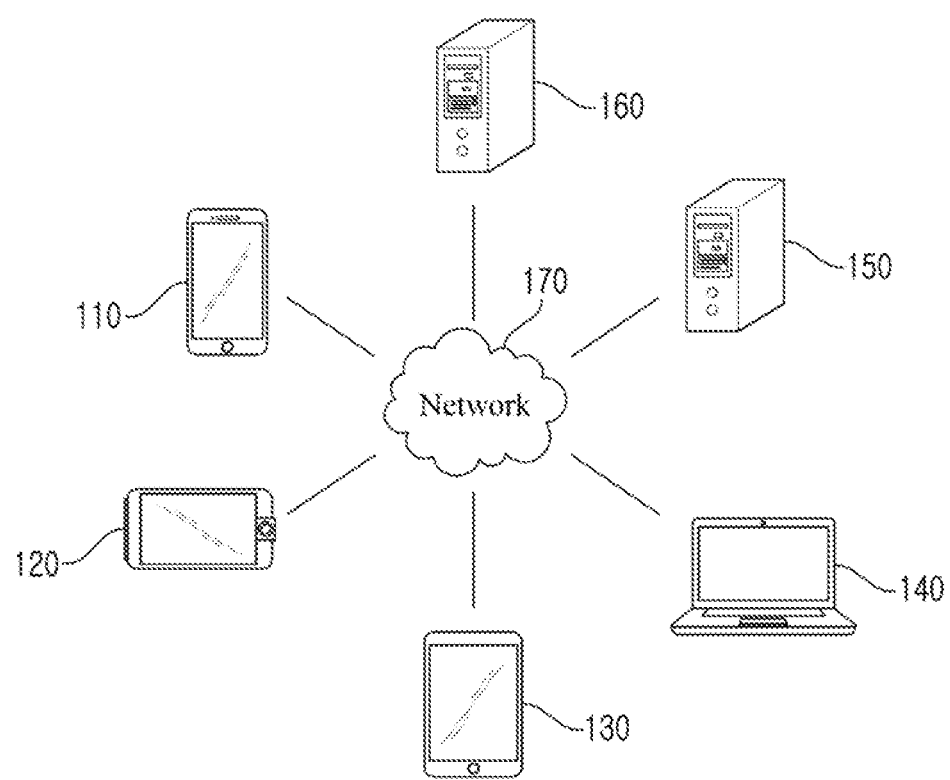
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A multi-profile providing system according to example embodiments may be implemented through a computer apparatus, such as, for example, an electronic device or a server, which is described below. Here, a computer program according to an example embodiment may be installed and executed on the computer apparatus and the computer apparatus may perform a multi-profile providing method according to example embodiments under control of the executed computer program. The aforementioned computer program may be stored in a non-transitory computer-readable record medium to implement the multi-profile providing method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), Internet, and the like. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the first service may be a social networking service (SNS). In this case, the server 150 may provide various services providable as the social networking service, such as, for example, a messaging service and a timeline service, to the plurality of electronic devices 110, 120, 130, and 140 on which an application linked with a service is installed through the application. Also, the server 160 may provide the plurality of electronic devices 110, 120, 130, and 140 with a service that distributes an installation file for installing the application, as the second service.

A multi-profile providing system according to example embodiments may be configured using the server 150. The multi-profile providing system may provide members of social media sites or applications with a feature of using multiple profiles through the social media sites or applications. Depending on example embodiments, the multi-profile providing system may be configured using a computer apparatus separate from a system that provides the social networking service and configured to provide a related function while communication with the system that provides the social networking service over the network 170.

Figure 2:
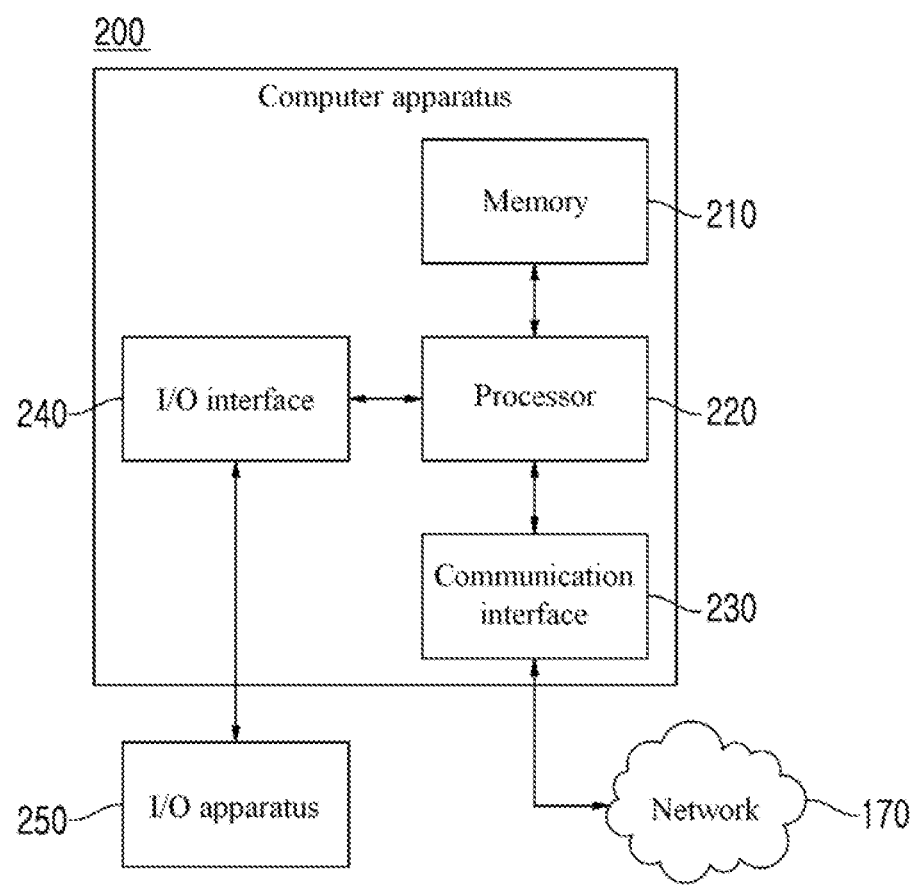
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the plurality of servers 150 and 160 may be implemented by a computer apparatus 200 of FIG. 2. A multi-profile providing method according to example embodiments may be performed by a multi-profile providing system implemented by the computer apparatus 200. If the multi-profile providing system is configured in the server 140, the multi-profile providing method according to example embodiments may be performed by the computer apparatus 200 that implements the server 150. For example, a computer program according to an example embodiment may be installed and executed on the computer apparatus 200, and the computer apparatus 200 may perform the multi-profile providing method under control of the executed computer program. Depending on example embodiments, the multi-profile providing system may be configured through a combination of a plurality of computer apparatuses.

Referring to FIG. 2, the computer apparatus 200 may include a memory 210, a processor 220, a communication interface 230, and an input/output (I/O) interface 240. The memory 210 may include a permanent mass storage device, such as random access (RAM), read only memory (ROM), and a disc drive, as a non-transitory computer-readable storage medium. Here, the permanent mass storage device, such as ROM and disc drive, may be included in the computer apparatus 200 as a separate permanent storage device different from the memory 210. Also, an operating system (OS) and at least one program code may be stored in the memory 210. Such software components may be loaded from another non-transitory computer-readable storage medium to the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, the software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 210.

The communication interface 230 may provide a communication channel between the computer apparatus 200 and another apparatus, for example, the aforementioned storage devices, over the network 170. For example, the processor 220 of the computer apparatus 200 may transfer data, a file, a request or an instruction created based on the program code stored in the storage device, such as the memory 220, to other apparatuses over the network 170 under control of the communication interface 230. The computer apparatus 200 may receive a signal, an instruction, data, a file, and the like, from another apparatus through the communication interface 230 of the computer apparatus 200. For example, a signal, an instruction, and data received through the communication interface 230 may be transferred to the processor 220 or the memory 210, and may be stored in a storage medium, for example, the permanent storage device of the computer apparatus 200.

The I/O interface 240 may be a device used for interface with an I/O apparatus 250. For example, an input device may include a device, such as a microphone, a keyboard, and a mouse, and an output device may include a device, such as a display device and a speaker. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. For example, the computer apparatus 200 may include at least a portion of the I/O apparatus 250, or may further include other components, for example, a transceiver, a database (DB), and the like.

Figure 3:
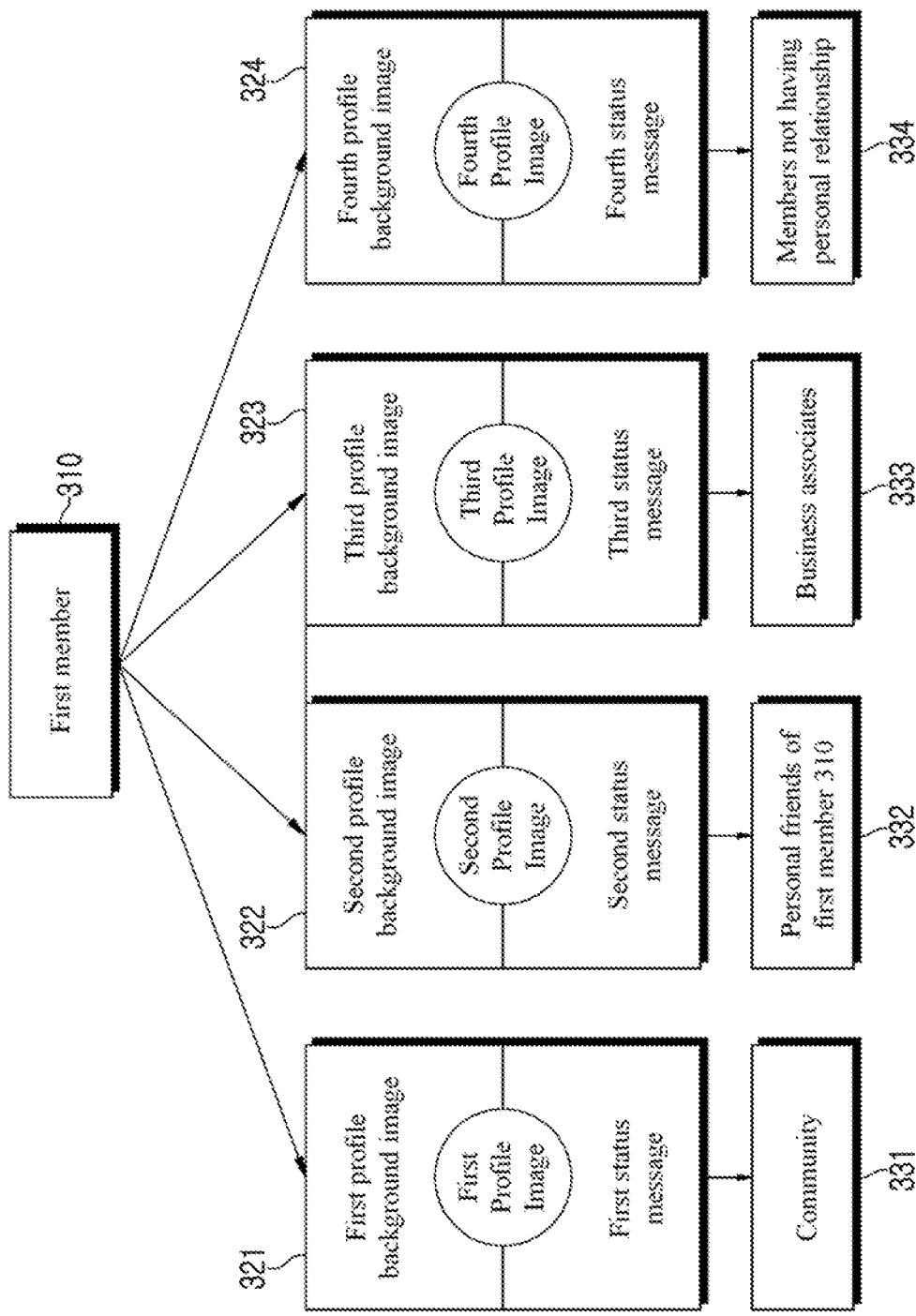
FIG. 3 illustrates an example of providing a multi-profile according to at least one example embodiment.

FIG. 3 illustrates an example of providing a multi-profile according to at least one example embodiment. Referring to FIG. 3, a plurality of different profiles, for example, a first profile 321, a second profile 322, a third profile 323, and a fourth profile 324, are created for a first member 310 of a social networking service. The different profiles, for example, the first profile 321, the second profile 322, the third profile 323, and the fourth profile 324, are respectively provided to different groups of people, for example, members having a personal relationship with the first member (e.g., a community 331, personal friends 332, business associates 333 of the first member 310) and members 334 not having a personal relationship with the first member 310.

Although each of the different profiles, for example, the first profile 321, the second profile 322, the third profile 323, and the fourth profile 324, of FIG. 3, is configured using a different profile image, profile background image, and status message, the expression "different profiles" used herein may refer to profiles having at least one of the different profile elements.

As described above, according to example embodiments, a plurality of personal profiles may be created and a service may be provided, such that different profiles may be provided to counterparts, respectively, depending on who a corresponding counterpart is.

Figure 4:
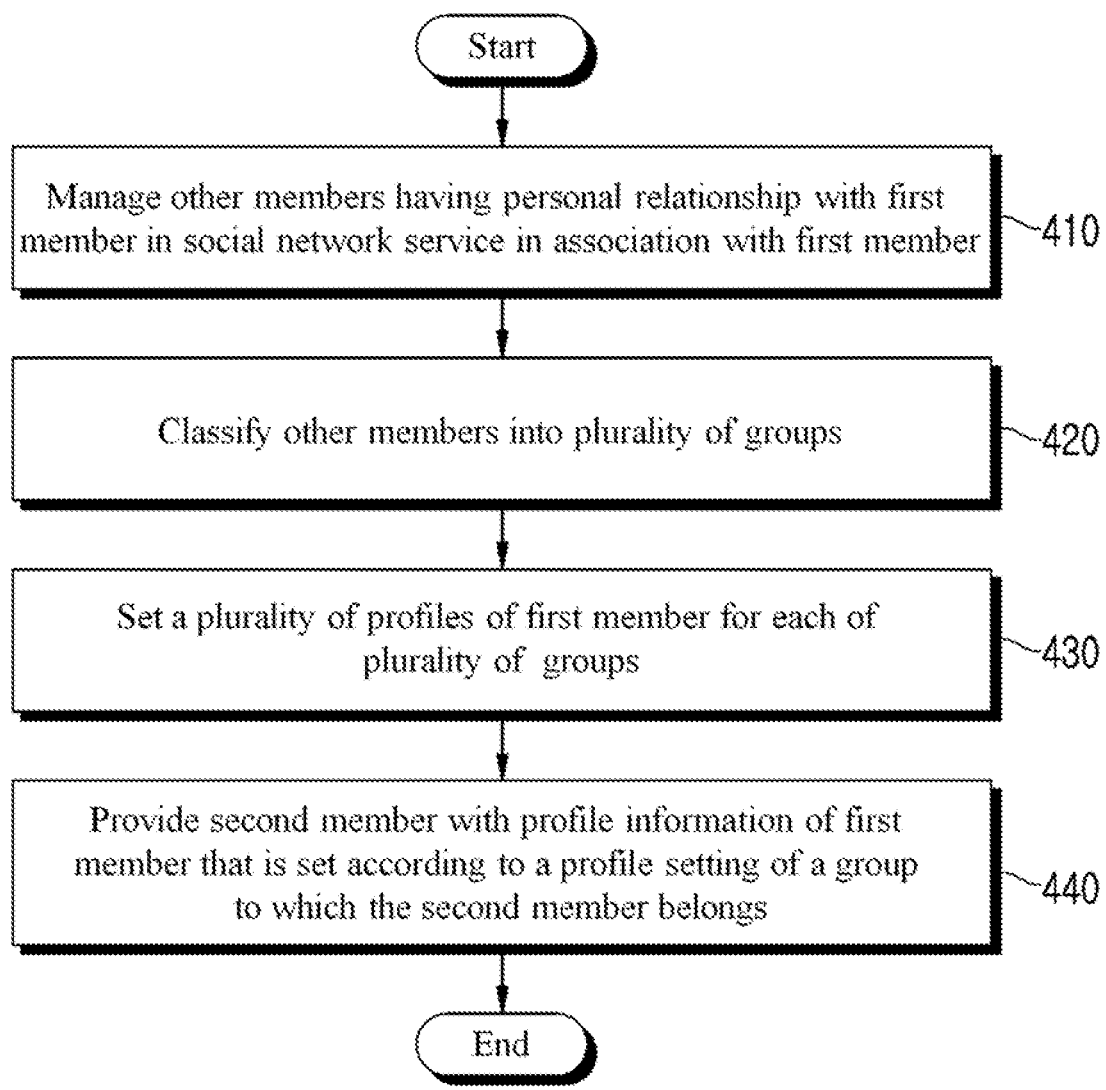
FIG. 4 is a flowchart illustrating an example of a multi-profile providing method according to at least one example embodiment.

FIG. 4 is a flowchart illustrating an example of a multi-profile providing method according to at least one example embodiment. The multi-profile providing method of FIG. 4 may be performed by the computer apparatus 200. For example, the processor 220 of the computer apparatus 200 may be configured to execute a control instruction according to a code of at least one program or a code of an OS included in the memory 210. Here, the processor 220 may control the computer apparatus 200 to perform operations 410 to 440 included in the multi-profile providing method of FIG. 4 according to the control instruction provided from the code stored in the computer apparatus 200.

Referring to FIG. 4, in operation 410, the computer apparatus 200 may manage other members having a personal relationship with a first member in a social networking service in association with the first member. For example, the computer apparatus 200 may store an account of the first member in the social networking service in a database in association with accounts of other members having a personal relationship with the first member in the social networking service.

In operation 420, the computer apparatus 200 may classify the other members into a plurality of groups. For example, the computer apparatus 200 may classify, into a plurality of groups, accounts of other members stored in the database in association with the account of the first member, and may store a group identifier capable of identifying each corresponding group in the database in association with the accounts of the other members. In detail, for example, if a member AAA having a personal relationship with the first member is classified into a group A, the account of the first member, an account of the member AAA, and an identifier of the group A may be associated with one another and thereby stored in the database.

In operation 430, the computer apparatus 200 may set a plurality of profiles of the first member for each of the plurality of groups. For example, the computer apparatus 200 may store an identifier of the group A in the database in association with an identifier of the first profile 321 of the first member. The computer apparatus 200 may extract the identifier of the first profile 321 from the database based on the identifier of the group A or may extract the identifier of the group A from the database based on the identifier of the first profile 321.

In operation 440, when the second member requests access to a profile of the first member, the computer apparatus 200 may provide the second member with profile information of the first member that is set according to a profile setting of a group to which the second member belongs, among the plurality of groups that are created in the account of the first member. For example, in the case of providing profile information of the first member to the second member, the computer apparatus 200 may extract the account of the second member from the database based on the account of the first member, may extract the identifier of the group A to which the member AAA belongs, and may extract the identifier of the first profile 321 of the first member stored in association with the identifier of the group A. In this case, the computer apparatus 200 may show the first profile 321 to the member AAA. If a member CCC belongs to a group B and the second profile 322 is set for the group B, the second profile 322 of the first member may be provided or shown to the member CCC. Here, the first profile 321 and the second profile 322 may be different profiles. That is, different profiles 321 and 322 of the first member may be provided or shown to the member AAA and the member CCC, respectively.

As described above, according to example embodiments, different profiles of a specific member may be provided based on groups of other members having a personal relationship in a social networking service.

Figure 5:
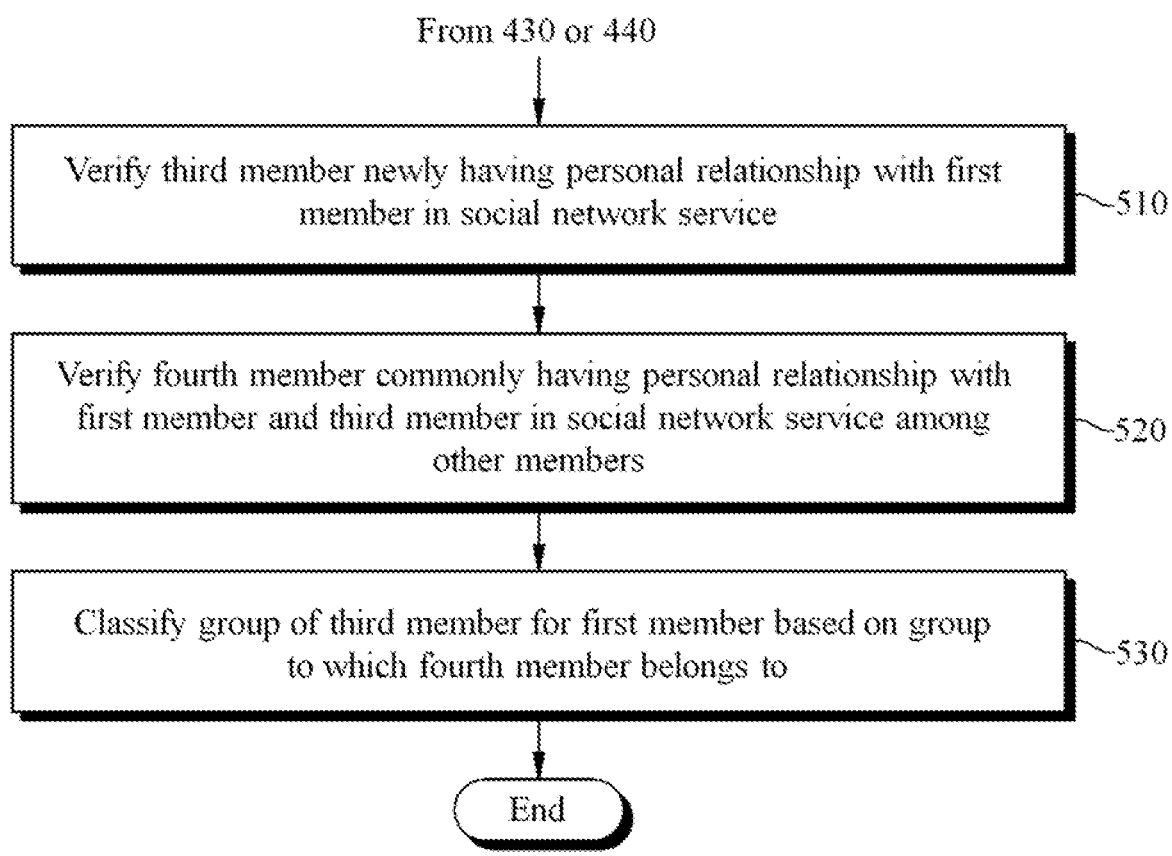
FIG. 5 is a flowchart illustrating another example of a multi-profile providing method according to at least one example embodiment.

FIG. 5 is a flowchart illustrating another example of a multi-profile providing method according to at least one example embodiment. The multi-profile providing method of FIG. 5 may further include operations 510 to 530 in addition to operations 410 to 440 of FIG. 4. Operations 510 to 530 of FIG. 5 may be performed by the computer apparatus 200 after operation 430 or 440 of FIG. 4.

Referring to FIG. 5, in operation 510, the computer apparatus 200 may verify a third member newly having a personal relationship with the first member in the social networking service. For example, if the first member adds the third member as a friend of the social networking service, the computer apparatus 200 may store an account of the third member in the database in association with the account of the first member.

In operation 520, the computer apparatus 200 may verify a fourth member commonly having a personal relationship with the first member and the third member in the social networking service among the other members. For example, it is assumed that the above member CCC commonly has a personal relationship with the first member and the third member in the social networking service. With the assumption that the member CCC has a common personal relationship with the first member and the third member, the account of the first member and an account of the member CCC may be associated with each other and thereby stored in the database. Also, the account of the third member and the account of the member CCC may be associated with each other and thereby stored in the database. Therefore, the computer apparatus 200 may verify that the member CCC commonly has a personal relationship with the first member and the third member in the social networking service by verifying the accounts of the first member, the third member, and the member CCC that are associated with one another and thereby stored.

In operation 530, the computer apparatus 200 may classify a group of the third member for the first member based on a group to which the fourth member belongs. For example, the computer apparatus 200 may set the group B to which the member CCC belongs to, as the group of the third member.

As described above, according to example embodiments, a group of a new friend of a member, that is, another member newly having a personal relationship with the member, may be automatically set. In the above example, since the second profile 322 of the first member is set to the group B, the second profile 322 is displayed for the third member that is a new friend of the first member.

Also, in operation 520, a plurality of members may commonly have a personal relationship with the first member and the third member. In particular, in operation 520, the computer apparatus 200 may set a group to which a largest number of fourth members belong, as the group of the third member for the first member. For example, if ten members have a common personal relationship with the first member and the third member and, among the ten members, seven members belong to the group A, two members belong to the group B, and a remaining one member belongs to a group C, the third group may be set to belong to the group A. Here, setting a group for a member may include storing the account of the third member and the identifier of the group A in the database through mutual association. As another example, in operation 520, the computer apparatus 200 may set a group to which the fourth member having a personal relationship most similar to that of the third member in the social networking service belongs, as the group of the third member for the first member.

Although an example embodiment in which the computer apparatus 200 automatically classifies the group of the third member is described above with reference to FIG. 5, the computer apparatus 200 may recommend the group of the third member to the first member and may set the group of the third member based on a selection from the first member.

For example, in operation 530, if the computer apparatus 200 recommends the group to which the fourth member is to belong to, as the group of the third member for the first member and the first member selects the recommended group, the computer apparatus 200 may set the recommended group as the group of the third member for the first member. That is, the computer apparatus 200 may automatically recommend a group to which the new friend is to belong and may entrust the first member with a selection thereof. If necessary, the computer apparatus 200 may provide a user interface that allows the first member to directly create the group to which the new friend is to belong or to select the group from among existing groups.

Figure 6:
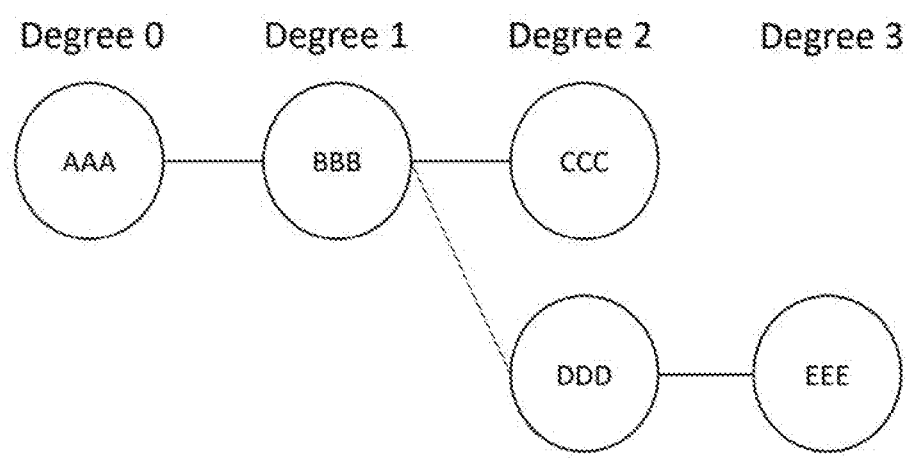
FIG. 6 illustrates an example of determining degrees of relationships between members of a social networking service according to at least one example embodiment.

Also, the computer apparatus 200 may use a personal relationship analysis between the entire members of the social networking service to classify the other members having a personal relationship with the first member into the plurality of groups. That is, the computer apparatus 200 may set groups of other members having a personal relationship with the first member based on the personal relationship analysis between the entire members of the social networking service. In detail, for example, the computer apparatus 200 may calculate a degree of a personal relationship between the entire members of the social networking service by analyzing the personal relationship between the entire members and may classify the other members into the plurality of groups by using the calculated degree as a parameter of a distance function. Here, the degree may represent how close a certain member is to other members in the social networking service. For example, as shown in FIG. 6, if a personal relationship is directly established between the member AAA and the member BBB, the degree of relationship of the member BBB may be one (1) relative to the member AAA. Also, if a personal relationship is not directly established between the member AAA and the member CCC and a personal relationship is directly established between the member BBB and the member CCC, the degree of relationship of the member CCC may be two (2) relative to the member AAA. Likewise, if a personal relationship is not directly established between the member AAA and a member DDD and a personal relationship is directly established between the member BBB and the member DDD, the degree of relationship of the member DDD may be two (2) relative to the member AAA. In a case where a member EEE has a direct personal relationship with the member DDD, the degree of relationship of the member EEE may be three (3). The computer apparatus 200 may calculate the degree of relationships between the entire users and may automatically classify the other members into the plurality of groups having a personal relationship with the first member by using a distance function having the calculated degree as a parameter. For example, a data clustering algorithm, such as a Density-Based Spatial Clustering of Application with Noise (DBSCAN) algorithm, may be used to classify (set) groups of members having a personal relationship based on given information, for example, the degree calculated for the entire users, using the degree and the distance function.

As described above, according to example embodiments, groups of members may be set automatically through the computer apparatus 200 and various methods. Depending on example embodiments, an automatic group classification and a direct group creation or selection by the first member may be used together.

Figure 7:
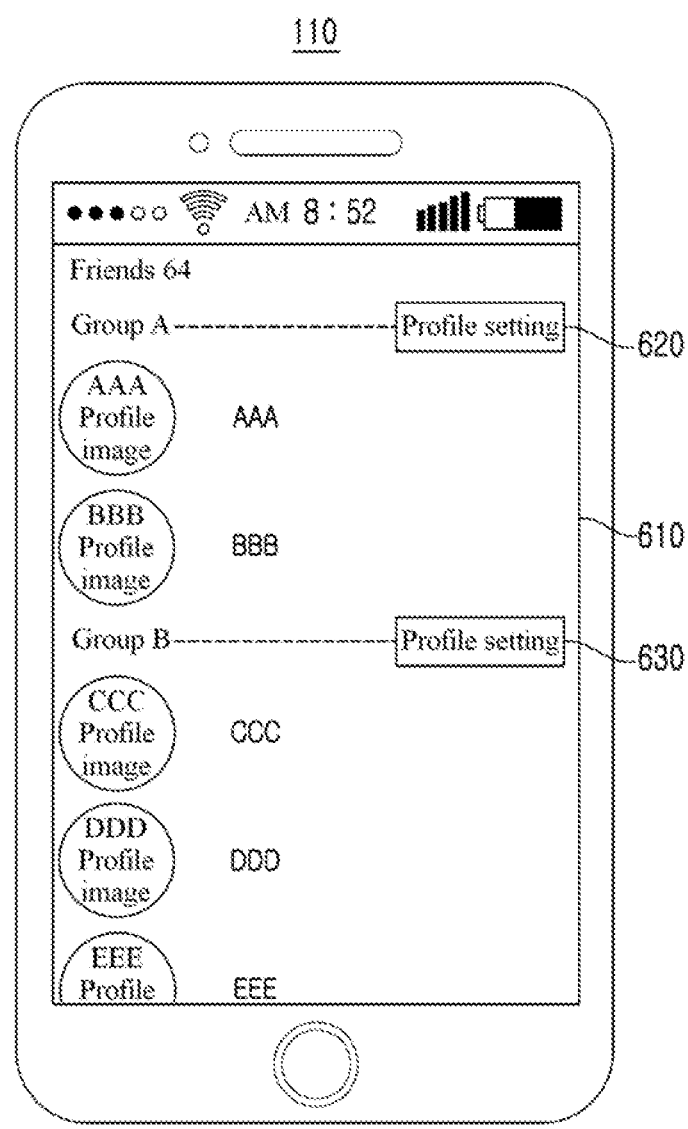
FIG. 7 illustrates an example of displaying profile information according to at least one example embodiment.

The computer apparatus 200 may separately display profile information of each of the other members for each corresponding classified group. FIG. 7 illustrates an example of displaying profile information according to at least one example embodiment. As described above, friends of the first member may be classified into a plurality of groups. Therefore, in the case of displaying profile information of the friends, the computer apparatus 200 may separately display the profile information for the respective corresponding classified groups. Referring to FIG. 7, a screen 610 of the electronic device 110 represents an example in which profile information of other members having a personal relationship with the first member is separately displayed based on groups, for example, a group A and a group B into which other members AAA, BBB, CCC, DDD, and EEE are classified.

Also, first and second user interfaces 620 and 630 are provided on the screen 610 to allow a user to set his or her profile differently for different groups (e.g., the group A and the group B). For example, a profile setting function that allows the first user to set a profile to be displayed for members of the group A may be provided through the first user interface 620. Also, a profile setting function that allows the first member to set a profile to be displayed for members belonging to the group B may be provided through the second user interface 630.

Figure 8:
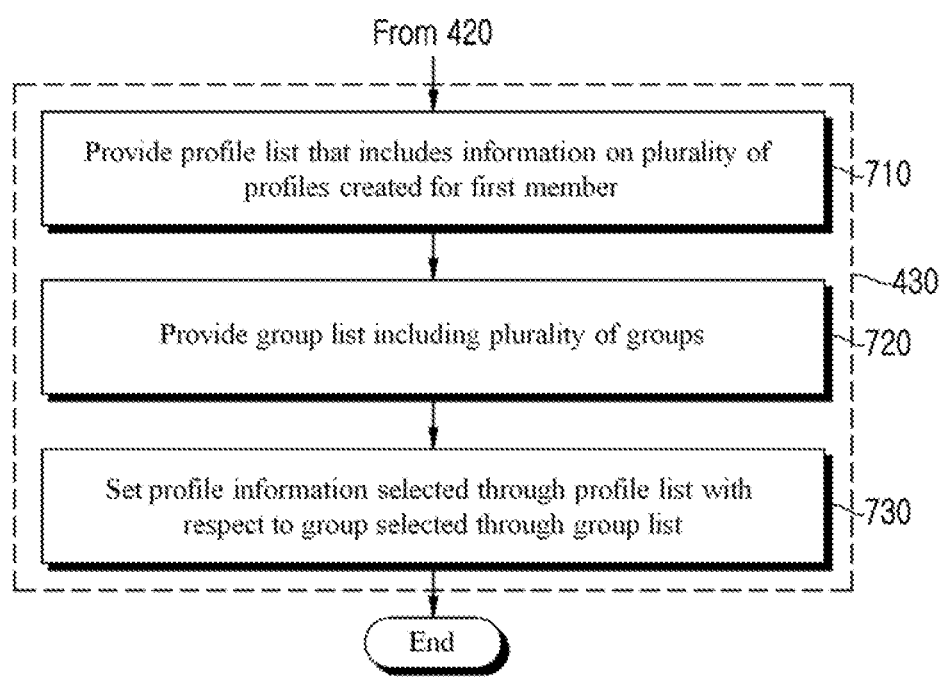
FIG. 8 is a flowchart illustrating another example of a multi-profile providing method according to at least one example embodiment.

FIG. 8 is a flowchart illustrating another example of a multi-profile providing method according to at least one example embodiment. The multi-profile providing method of FIG. 8 may further include operations 710 to 730 in addition to operations 410 to 440 of FIG. 4. Operations 710 to 730 of FIG. 8 may be included in operation 430 of FIG. 4 and performed by the computer apparatus 200.

Referring to FIG. 8, in operation 710, the computer apparatus 200 may provide a profile list that includes information on a plurality of profiles created for the first member. Here, profile information created for the first member may include profile information directly created by the first member and/or profile information automatically created by the computer apparatus 200 for the first member. Example embodiments in which the computer apparatus 200 automatically creates profile information are further described below.

In operation 720, the computer apparatus 200 may provide a group list including the plurality of groups. For example, the computer apparatus 200 may provide a group list to the first member such that the first member may select at least one group from the group list including the plurality of groups.

In operation 730, the computer apparatus 200 may set profile information selected through the profile list with respect to a group selected through the group list. For example, it is assumed that the profile list including the first profile 321, the second profile 322, and the third profile 323 is present for the first member and the group list including groups A, B, and C is present. With this assumption, each of the profile list and the group list may be provided to the first member and the computer apparatus 200 may verify each of a profile selected by the first member from the profile list and selected by the first member from the group list. For example, with the assumption that the third profile 323 and the group B are selected, the computer apparatus 200 may set a profile of the first member corresponding to the group B as the third profile 323. In this case, the profile of the first member provided to members belonging to the group B may be the third profile 323.

As described above with FIG. 8, a profile may be set for each group of the first member. Also, the computer apparatus 200 may provide a function capable of setting a profile for each friend depending on example embodiments. For example, the computer apparatus 200 may provide a member list that is a list of other members having a personal relationship with the first member instead of providing the group list described with the example embodiment of FIG. 8 and may set a profile selected through the profile list for a member selected through the member list. For example, with the assumption that the profile list including the first profile 321, the second profile 322, and the third profile 323 is present for the first member and the member list including the member AAA, the member BBB, and the member CCC is present, each of the profile list and the member list may be provided to the first member and the computer apparatus 200 may verify each of a profile that is selected by the first member from the profile list and a member that is selected by the first member from the member list. For example, with the assumption that the second profile 322 and the member CCC are selected, the computer apparatus 200 may set a profile of the first member corresponding to the member CCC as the second profile 322. In this case, the second profile 322 may be displayed for the member CCC in association with the first member.

Also, when the user selects a specific member and sets profile information, the computer apparatus 200 may reset a group of the selected specific member based on the profile information set for the selected specific member. For example, it is assumed that the member AAA belongs to the group A and the group A is associated with the first profile 321, and the second profile 322 is associated with the group B. Here, if the first member sets the second profile 322 for the member AAA, the computer apparatus 200 may reset a group of the member AAA by changing the group of the member AAA from the group A to the group B.

When the computer apparatus 200 identifies a change in the relationship between the first member and the member AAA and determines that the member AAA belongs to the group B according to the changed relationship, the computer apparatus 200 may assign the group B to the member AAA instead of the group A. In turn, when the computer apparatus 220 receives, from the member AAA, a request to provide the profile information of the first member, the computer apparatus 200 may provide the member AAA with a profile of the first member that is set for the group B (instead of a profile of the first member that is set for the group A) among a plurality of different profiles of the first member.

Also, as described above, the computer apparatus 200 may automatically create profile information of a user. To this end, the computer apparatus 200 may use messages, for example, images, videos, and audios, sent and received between the first member and the specific group or the specific member through the social networking service.

Figure 9:
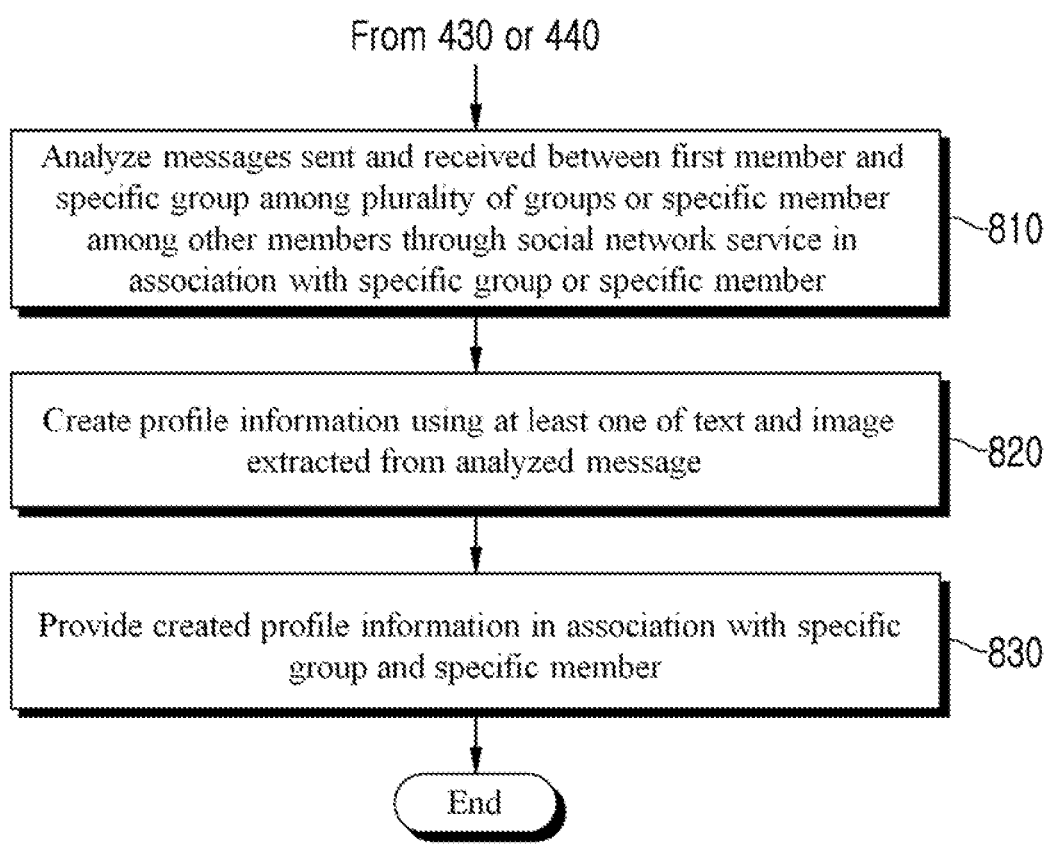
FIG. 9 illustrates an example of an automatic profile creation method according to at least one example embodiment.

FIG. 9 illustrates an example of an automatic profile creation method according to at least one example embodiment. The multi-profile providing method of FIG. 9 may further include operations 810 to 830 in addition to operations 410 to 440 of FIG. 4. Operations 810 to 830 of FIG. 9 may be performed by the computer apparatus 200 after operation 430 or 440 of FIG. 4.

Referring to FIG. 9, in operation 810, the computer apparatus 200 may analyze messages exchanged between the first and a specific group among the plurality of groups or a specific member among the other members through the social networking service in association with the specific group or the specific member. For example, such a message may include content on conversation between the first member and a member belonging to the specific group or the specific member. As another example, the message may include an answer, for example, a comment posted by the first member to a posting of a member of the specific group or the specific member. The message may include a variety of information on activities of the first member for another member through the social networking service.

In operation 820, the computer apparatus 200 may create profile information using at least one of a text and an image extracted from the analyzed message. For example, the extracted text may include a user name, for example, honey, daddy, XX's mom, and a nickname between friends, extracted from conversation content between members. In detail, for example, the computer apparatus 200 may extract a user name by extracting a noun/proper noun through a morpheme analysis of a natural language analysis and by matching a ratio of an actual number of responses to a user name and a keyword corresponding to a response in terms of dictionary. Also, for example, an extracted image may include at least one frame of a photo or a video exchanged between members. In detail, the computer apparatus 200 may extract a photo liked by members by performing a natural language analysis and an emotion analysis on photos and reactions of the members to each of the photos. For example, the computer apparatus 200 may extract a specific photo by analyzing a number of recommendations on a photo uploaded to a timeline or a number of messages, contents of messages, etc., received from other members in a chatroom within a preset period of time in association with a photo uploaded to the chatroom. Here, based on content of messages received within a period of time preset after a photo is uploaded, the computer apparatus 200 may determine whether a corresponding message includes content relating to the uploaded photo. Also, the computer apparatus 200 may determine a level of positive response of other members to the uploaded photo based on content of the messages. In terms of content of conversation, whether a topic is changed or whether the conversation on the photo continues may be determined through appearance of nouns/verbs using a morpheme analysis. A level of positive response of other members to the photo may be determined based on how frequently dictionary words corresponding to an emotional evaluation appear in the conversation on the photo and an emotional evaluation value calculated in advance for a corresponding word. As another example, the computer apparatus 200 may retrieve a photo including a face of the first member from among photos and may extract only a facial portion of the first member from the retrieved photo. To this end, a facial recognition method may be used. That is, the computer apparatus 200 may extract a face of the first member from the uploaded photo by comparing a face of the first member in photos previously set as profile images by the first member to the uploaded photo. Also, the computer apparatus 200 may reduce the image extraction range to a photo that includes the face of the first member by at least a preset ratio.

In operation 830, the computer apparatus 200 may provide the created profile information in association with the specific group or the specific member. For example, the computer apparatus 200 may extract a user name of the member A that is used in a messenger chatroom and may use the extracted user name as a status message to be shown to the member A. As another example, the computer apparatus 200 may extract a face of the first member from a photo sent from the first member to the member A in the messenger chatroom and may use the extracted face of the first member as a profile image of a profile of the first member to be provided to the member A. Also, the computer apparatus 200 may use the extracted image as a profile background image of the profile. In this case, the member A may be provided with the profile of the first member in which the appellation, the facial image, and the background image with which the member A is familiar through conversation with the first member are automatically set to the status message, the profile image, and the background image of the profile, respectively. Also, the first member may provide the member A with a profile automatically created by the computer apparatus 200. In particular, the profile may be automatically created and provided and also, the profile faithful to messages exchanged between the first member and the member A may be provided.

As described above, according to example embodiments, it is possible to display a multi-profile and to automate a profile display setting in a social networking service. Also, it is possible to automatically create groups of other users having a personal relationship, for example, a friend relation with a user. Also, it is possible to provide a user interface that allows the user to manage a plurality of profiles and to apply a different profile for each corresponding created group. Also, it is possible to automatically create and/or recommend a profile to be displayed for a specific group or a specific acquaintance of the user.

The systems or the apparatuses described herein may be implemented using hardware components, software components, and/or a combination thereof. For example, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A multi-profile providing method comprising:
   identifying a relationship between a profile owner in an online social networking service with each of a plurality of members in the online social networking service;
   classifying the plurality of members into a plurality of groups based on the relationship between the profile owner and each of the plurality of members;
   setting a plurality of profiles of the profile owner for the plurality of groups, respectively;
   in response to a request to provide profile information of the profile owner being received from a first member among the plurality of members, identifying a first group of the plurality of groups to which the first member belongs, and providing the first group or the first member with a first profile of the profile owner that is set for the first group to which the first member belongs, among the plurality of profiles;

identifying a photo that is exchanged through the online social networking service between the profile owner and the first group or between the profile owner and the first member, and that has received reactions more than a predetermined number;

creating the first profile based on the identified photo;

providing the first profile to the first group or the first member, in response to the profile owner having a personal relationship with a new member in the online social networking service, identifying a second group in which a number of members that have a common personal relationship with the profile owner and the new member is greatest among the plurality of groups, and presenting to the new member a second profile that is set for the second group, among the plurality of profiles of the profile owner; and in response to the profile owner setting the first profile for the new member, removing the new member from the second group and adding to the first group.

2. The multi-profile providing method of claim 1, wherein the classifying the plurality of members into the plurality of groups comprises setting the plurality of groups based on analysis of a personal relationship between all members of the online social networking service, and wherein all the members comprise the profile owner and the plurality of members.

3. The multi-profile providing method of claim 1, wherein the classifying the plurality of members into the plurality of groups comprises calculating a degree of a personal relationship between all members of the online social networking service, by analyzing the personal relationship between all the members and classifying the plurality of members into the plurality of groups by using the calculated degree as a parameter of a distance function, and wherein all the members comprise the profile owner and the plurality of members.

4. The multi-profile providing method of claim 1, further comprising:

displaying a first user interface that shows the plurality of members included in the first group, and allows the profile owner to set the first profile for the first group, and a second user interface that shows the plurality of members included in a second group, and allows the profile owner to set a second profile for the second group, on a same display screen.

5. The multi-profile providing method of claim 1, wherein the setting the plurality of profiles for the plurality of groups comprises:

providing a profile list comprising the plurality of profiles of the profile owner;

providing a group list comprising the plurality of groups; and setting profile information of a profile selected from the profile list with respect to a group selected from the group list.

6. The multi-profile providing method of claim 1, further comprising:

providing a profile list comprising the plurality of profiles of the profile owner;

providing a member list comprising the plurality of members; and setting profile information of a profile selected from the profile list with respect to a member selected from the member list.

7. The multi-profile providing method of claim 1, further comprising:

analyzing messages exchanged through the online social networking service between the profile owner and the first group or between the profile owner and the first member;

creating one of the plurality of profiles based on an image that is identified as including a face of the profile owner and is extracted from the analyzed message; and providing the created profile to the first group or the first member.

8. A non-transitory computer-readable record medium storing instructions that, when executed by a processor, cause the processor to perform the multi-profile providing method of claim 1.

9. A computer apparatus comprising:

at least one memory configured to store computer-readable instructions; and at least one processor configured to execute the computer-readable instructions to:

identify a relationship between a profile owner in a social networking service with each of a plurality of members in the social networking service, classify the plurality of members into a plurality of groups based on the relationship between the profile owner and each of the plurality of members, set a plurality of profiles of the profile owner for the plurality of groups, respectively;

in response to a request to provide profile information of the profile owner being received from a first member among the plurality of members, identify a first group of the plurality of groups to which the first member belongs, and provide the first member or the first group with a first profile of the profile owner that is set for the first group to which the first member belong, among the plurality of profiles;

identifying a photo that is exchanged through the online social networking service between the profile owner and the first group or between the profile owner and the first member, and that has received reactions more than a predetermined number;

creating the first profile based on the identified photo;

providing the first profile to the first group or the first member, in response to the profile owner having a personal relationship with a new member in the online social networking service, identify a second group in which a number of members that have a common personal relationship with the profile owner and the new member is greater among the plurality of groups, and presenting to the new member a second profile that is set for the second group, among the plurality of profiles of the profile owner; and in response to the profile owner setting the first profile for the new member, removing the new member from the second group and adding to the first group.

10. The computer apparatus of claim 9, wherein the at least one processor is further configured to execute the computer-readable instructions to set the plurality of groups of members based on analysis of a personal relationship between all members of the social networking service, and wherein all the members comprise the profile owner and the plurality of members.

11. The computer apparatus of claim 9, wherein the at least one processor is further configured to execute the computer-readable instructions to calculate a degree of a personal relationship between all members of the social networking service, by analyzing the personal relationship between all the members and classifying plurality of the members into the plurality of groups based on the calculated degree as a parameter of a distance function, and wherein all the members comprise the profile owner and the plurality of members.

12. The computer apparatus of claim 9, wherein the at least one processor is further configured to execute the computer-readable instructions to:

provide a profile list comprising the plurality of profiles of the profile owner, provide a group list comprising the plurality of groups, and set profile information of a profile selected from the profile list with respect to a group selected from the group list.

13. The computer apparatus of claim 9, wherein the at least one processor is further configured to execute the computer-readable instructions to:

analyze messages exchanged through the social networking service between the profile owner and the first group or between the profile owner and the first member, create one of the plurality of profiles based on an image that is identified as including a face of the profile owner and is extracted from the analyzed messages, and provide the created profile to the first group and the first member.

14. The computer apparatus of claim 9, wherein the at least one processor is further configured to execute the computer-readable instructions to:

identify a change in the relationship between the profile owner and the first member;

assign the first group to the first member, among the plurality of groups, based the change in the relationship between the profile owner and the first member; and in response to the request to provide the profile information of the profile owner being received from the first member, provide the first member with the first profile that is set for the first group, among the plurality of profiles.

\* \* \* \* \*